US010764390B2

(12) United States Patent
Nanavati et al.

(10) Patent No.: US 10,764,390 B2
(45) Date of Patent: *Sep. 1, 2020

(54) CACHING CORE JAVASCRIPT BUNDLES

(71) Applicant: Walmart Apollo, LLC, Bentonville, AR (US)

(72) Inventors: Arpan Y. Nanavati, Castro Valley, CA (US); Jeffrey Jawad McRiffey, Knoxville, TN (US); Alexander Grigoryan, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/264,619

(22) Filed: Jan. 31, 2019

(65) Prior Publication Data
US 2020/0252476 A1    Aug. 6, 2020

Related U.S. Application Data

(63) Continuation-in-part of application No. 16/264,509, filed on Jan. 31, 2019.

(51) Int. Cl.
| G06F 16/95 | (2019.01) |
| H04L 29/08 | (2006.01) |
| G06F 16/957 | (2019.01) |
| G06F 16/958 | (2019.01) |
| G06F 8/65 | (2018.01) |
| G06F 9/50 | (2006.01) |
| G06F 8/71 | (2018.01) |

(52) U.S. Cl.
CPC ............ *H04L 67/2842* (2013.01); *G06F 8/65* (2013.01); *G06F 8/71* (2013.01); *G06F 9/5083* (2013.01); *G06F 16/9574* (2019.01); *G06F 16/986* (2019.01); *H04L 67/02* (2013.01)

(58) Field of Classification Search
CPC ..... H04L 67/02; H04L 67/2842; H04L 67/42; H04L 41/0253; G06F 16/9574; G06F 16/95; G06F 9/445
See application file for complete search history.

(56) References Cited

U.S. PATENT DOCUMENTS

| 8,464,349 | B2 | 6/2013 | Yee et al. |
| 8,805,965 | B2 | 8/2014 | Day et al. |
| 9,298,455 | B1* | 3/2016 | Kolam .................... G06F 16/95 |
| 9,307,007 | B2 | 4/2016 | Kapadia et al. |
| 9,442,709 | B1 | 9/2016 | Delker et al. |
| 2011/0055683 | A1 | 3/2011 | Jiang |
| 2014/0310392 | A1* | 10/2014 | Ho .......................... H04L 67/02 709/223 |

(Continued)

*Primary Examiner* — Hitesh Patel
(74) *Attorney, Agent, or Firm* — Bryan Cave Leighton Paisner LLP

(57) ABSTRACT

A method including retrieving application code of a webpage comprising a core code JavaScript bundle and a dynamic JavaScript bundle. The method transmitting to a user device of a user a service worker and the core code JavaScript bundle, wherein the core code JavaScript bundle is transmitted from the cache of the content delivery computer and is stored in a long-term cache memory of the user device. Facilitating a display of the webpage in a browser of the user device using the custom application code JavaScript bundle, and the core code JavaScript bundle. Other embodiments are disclosed.

20 Claims, 6 Drawing Sheets

(56) References Cited

U.S. PATENT DOCUMENTS

| | | |
|---|---|---|
| 2016/0344832 A1 | 11/2016 | Kukreja et al. |
| 2017/0109797 A1 | 4/2017 | Boffa et al. |
| 2018/0069945 A1 | 3/2018 | Graham-Cumming et al. |
| 2019/0303500 A1* | 10/2019 | Mathews .............. G06F 16/951 |

* cited by examiner

CACHING CORE JAVASCRIPT BUNDLES

CROSS-REFERENCE TO RELATED APPLICATION

This application is a Continuation-in-Part and claims the benefit of U.S. Non-Provisional application Ser. No. 16/264,509, filed Jan. 31, 2019. U.S. Non-Provisional application Ser. No. 16/264,509 is incorporated herein by reference in its entirety.

TECHNICAL FIELD

This disclosure relates generally to using a service worker to cache JavaScript application code in a content delivery server.

BACKGROUND

Conventional approaches for downloading a webpage for display on a computing device can take too long to complete due to the complexity of computer-run processes run for each webpage, such as a client-side process, which causes a viewer of the webpage to have to wait for the webpage to download and display. Moreover, each time another webpage is requested, a web server initiates the same computer-run process each and every time for each page requested from a user.

BRIEF DESCRIPTION OF THE DRAWINGS

To facilitate further description of the embodiments, the following drawings are provided in which.

Figure 1:
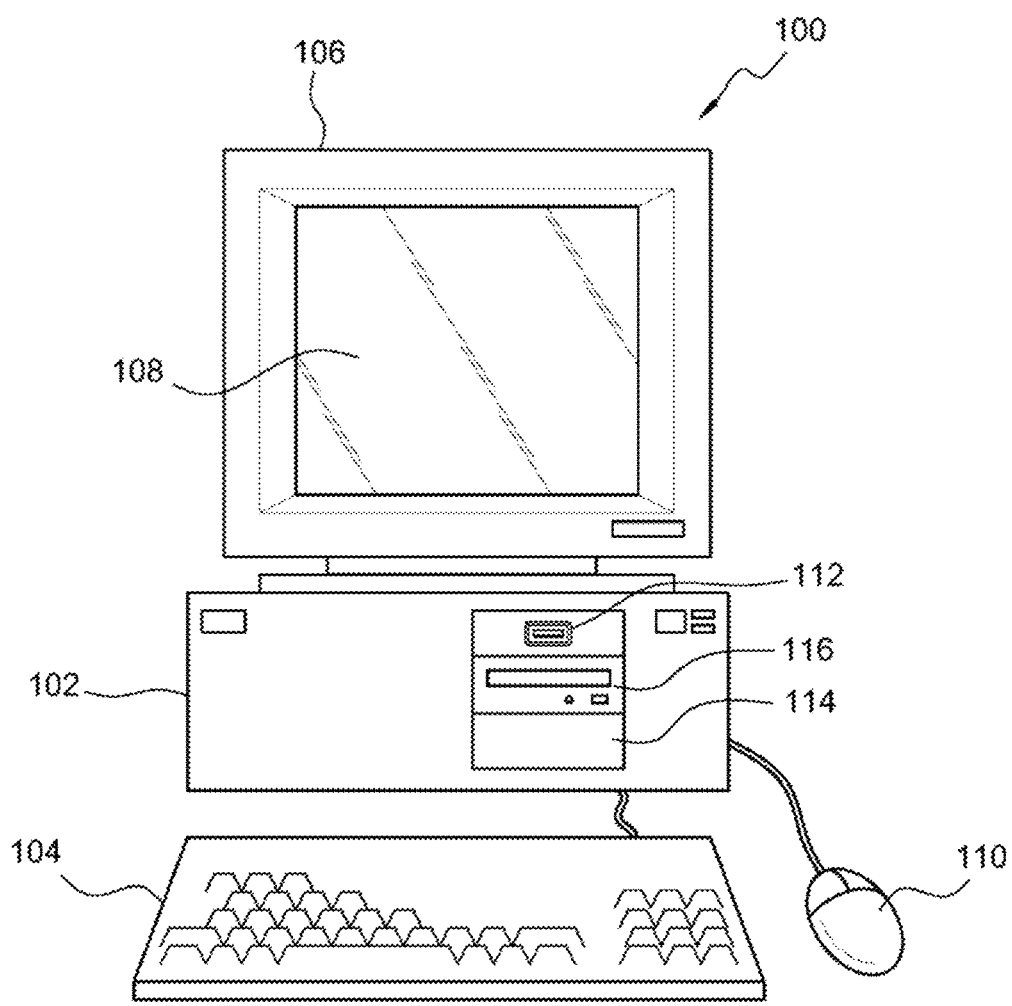
FIG. 1 illustrates a front elevational view of a computer system that is suitable for implementing an embodiment of the system disclosed in FIGS. 3-6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

To minimize or prevent a viewer of a webpage to have to wait too long for the webpage to download and display on a screen of a computing device of the view, a core code JavaScript for a webpage can be stored in a long-term cache of a user device and the remaining custom application code can be stored in a cache memory of a separate, special-purpose computer in accordance with many embodiments described herein. In the same or different embodiments, minimizing or preventing a viewer of a webpage to have to wait too long for the webpage to download and display on a screen of a computing device of the view, JavaScript for a webpage can be pre-loaded by a service worker on a user device by retrieving custom application code from a cache memory of a separate, special-purpose computer. In these ways, the webpage can be downloaded in real-time, more quickly, and directly to the user device.

Figure 2:
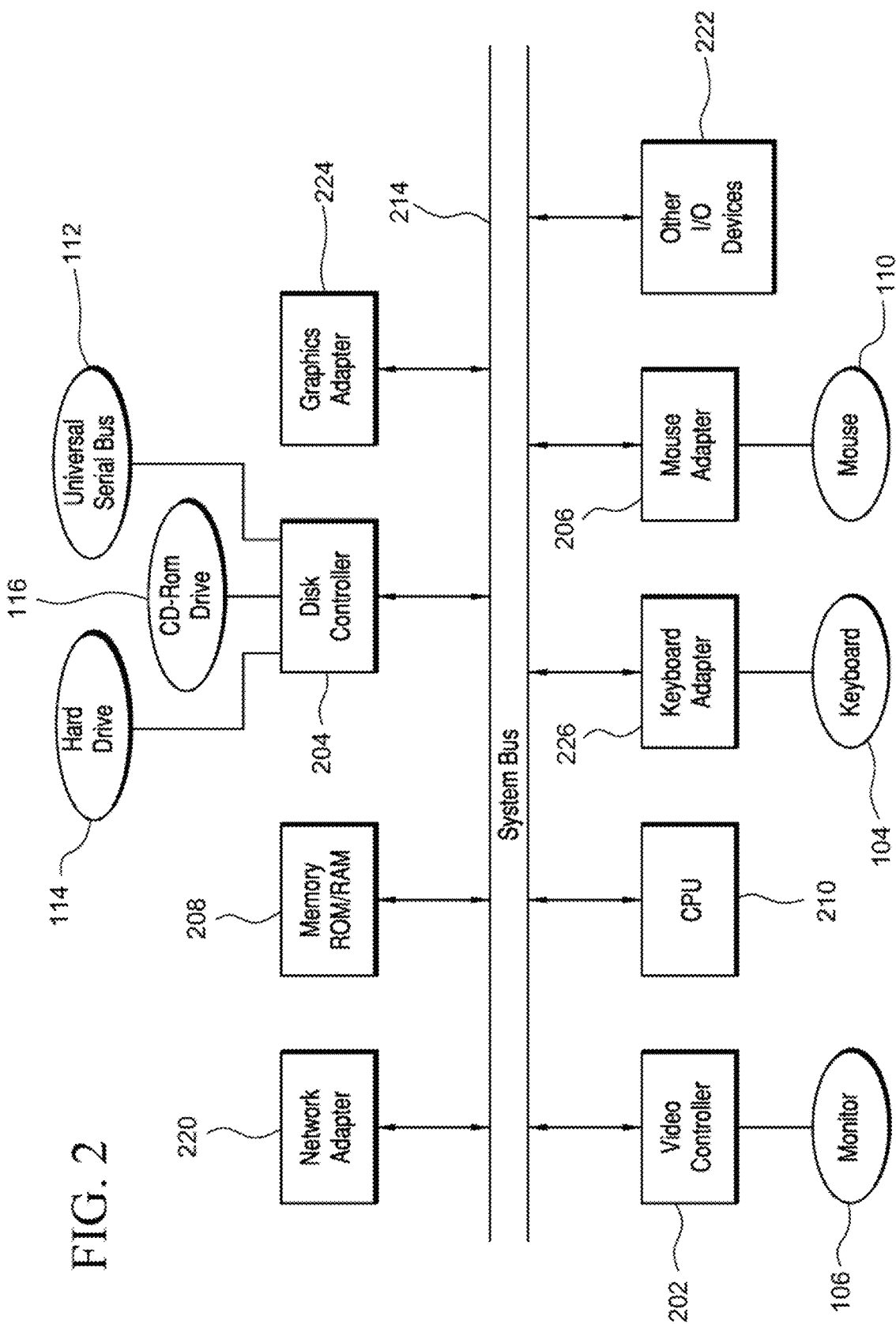
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
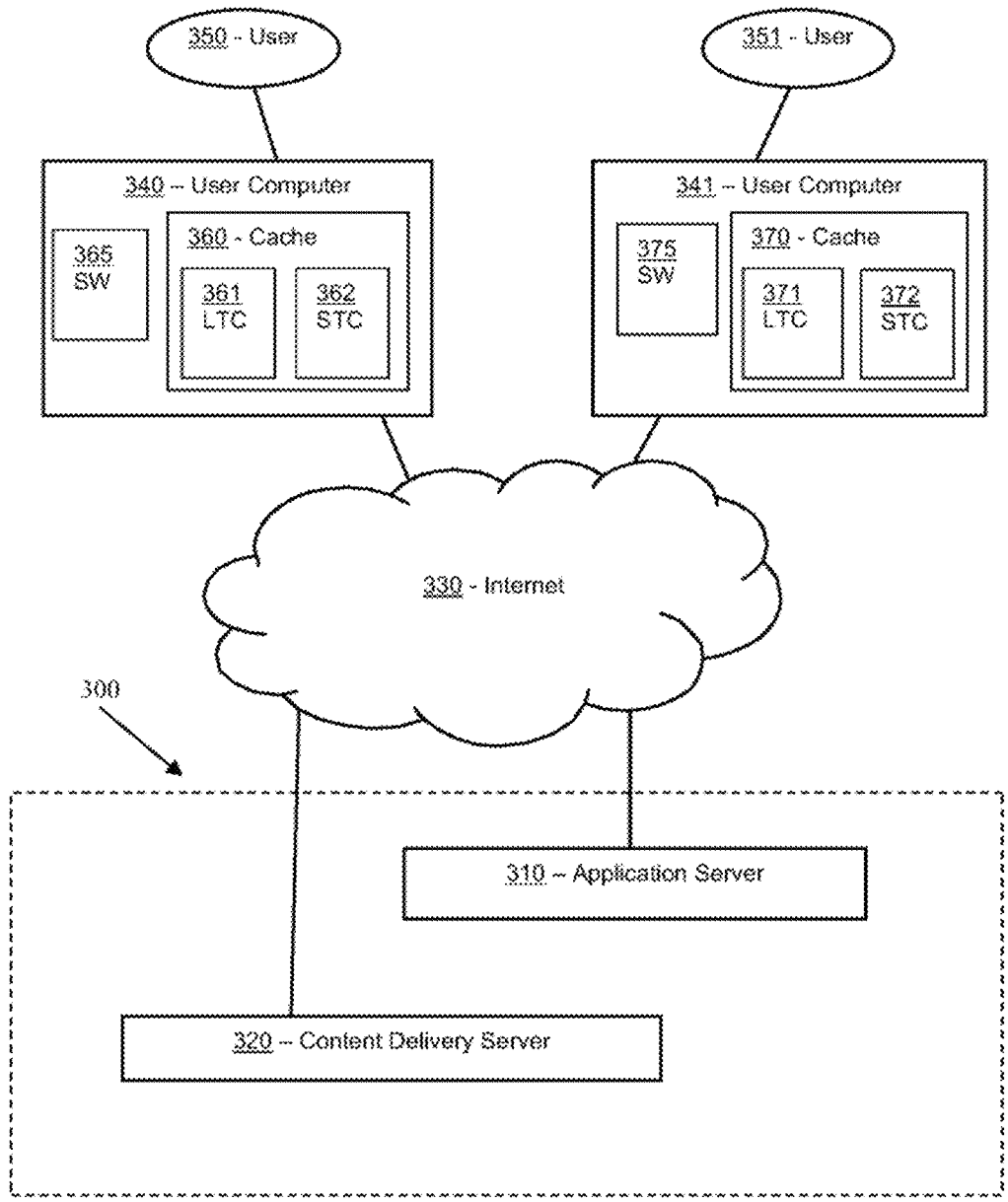
FIG. 3 illustrates a block diagram of a system that can be automatically rendering a webpage on a user device, according to an embodiment.

Turning ahead in the drawings, FIG. 3 illustrates a block diagram of a system 300 that can be employed for caching core JavaScript bundles, and/or pre-loading and caching application code, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an application server 310, and/or a content delivery server system 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

As shown in FIG. 3, system 300 can include application server 310 and/or content delivery server 320. Application server 310 and/or content delivery server 320 can each be a computer system, such as computer system 100 (FIG. 1), as described above, and can each be a single computer, a single server, or a cluster or collection of computers or servers, or a cloud of computers or servers. In another embodiment, a single computer system can host application server 310 and/or content delivery server 320. In a number of embodiments, application server 310 and/or content delivery server 320 can each be a computer system, such as computer system 100 (FIG. 1), as described above, and can each be a single computer, a single server, or a cluster or collection of computers or servers, or a cloud of computers or servers. In another embodiment, a single computer system can host application server 310 and/or content delivery server 320. Additional details regarding application server 310 and/or content delivery server 320 are described herein.

In a number of embodiments, each of content delivery server 320, and/or application server 310 can be a special-purpose computer programed specifically to perform specific functions not associated with a general-purpose computer. In many embodiments, content delivery server 320 can be a network of content delivery computers. Similarly, in several embodiments, application server 310 can be a network of application computers.

In some embodiments, content delivery server 320 can be a special-purpose computer programmed to perform specific functions and/or applications, such as, receiving application code including JavaScript bundles (e.g., code) of one or more webpages that can make up an entire website for a retailer (e.g., virtual retailer, on-line retailer, physical store), and storing the application code in a memory (e.g., cache memory) of the special-purpose computer system. In many embodiments, content delivery server 320 can be a special-purpose computer programmed to receive and/or store application code that can be split (e.g., divided) into a static JavaScript bundle (e.g., core code) and a dynamic JavaScript bundle (e.g., custom application code) of one or more webpages of a retailer (e.g., virtual retailer, on-line retailer, physical store) store. Thus, in many embodiments, the one or more webpages of a website can be stored in a memory (e.g., cache memory) in a special-purpose computer system, such as, content delivery server 320.

In several embodiments, content delivery server 320 can be a special-purpose computer programmed to perform specific functions and/or applications, such as, storing application code (e.g., Hypertext Markup Language code, "HTML code") including JavaScript bundles for each one of the multiple webpages that can make up a website. In many embodiments, content delivery server 320 can be a special-purpose programmed to perform specific functions and/or applications, such as, storing application code that can be divided into multiple JavaScript bundles including a static JavaScript bundle and a dynamic JavaScript bundle for each one of the multiple webpages of a website. In many embodiments, content delivery server 320 can be a content delivery network where one or more content delivery computers can be in data communication with one another and vice-versa.

In some embodiments, application server 310 can be a special-purpose computer programmed to perform specific functions and/or applications, such as, responding to a request from a user device, such as user computer 340, 341, by transmitting application code (e.g., HTML code) to the user device for a client-side webpage rendering process, wherein the application code (e.g., HTML code) comprises information that can include a location of the JavaScript bundles stored within the content delivery computer. Such JavaScript bundles can include a core code JavaScript bundle and a dynamic JavaScript bundle associated with rendering the requested webpage (e.g., home page, search page, browser page). In many embodiments, application server 310 can be a special-purpose computer programmed to perform specific functions and/or applications, such as, responding to a request from a user device, such as user computer 340, 341, by transmitting application code (e.g., HTML code) to the user device for a client-side webpage rendering process, wherein the application code (e.g., HTML code) information including an identification of JavaScript bundles stored in the content delivery computer. Such JavaScript bundles can include a core code JavaScript bundle and a dynamic JavaScript bundle associated with rendering the requested webpage (e.g., home page, search page, browse page).

In a number of embodiments, application server 310, and/or content delivery server 320 can be one or more special-purpose computers programed specifically to perform functions not associated with a general-purpose computer. In several embodiments, application server 310 can be a network of computers wherein one or more application computers can be in data communication with one another and vice versa. In many embodiments, content delivery server 320 can be a content delivery network where one or more content delivery computers can be in data communication with one another and vice-versa.

In many embodiments, application server 310 and/or content delivery server 320 can be in data communication through Internet 330 with one or more user computers, such as user computers 340 and/or 341. In some embodiments, user computers 340, 341 can be used by users, such as users 350 and 351, which also can be referred to as customers (e.g., users), in which case, user computers 340 and 341 can be referred to as customer computers. In many embodiments, am application server 310 can host one or more websites. For example, application server 310 can host a website that allows users to browse and/or search for items (e.g., products), to add items to an electronic cart, and/or to purchase items, in addition to other suitable activities.

In many embodiments, an internal network that is not open to the public can be used for communications between application server 310 and user computer 340-341. In several embodiments, an internal network that is not open to the public can be used for communications between content server 320 and user computer 340-341. In some embodiments, another internal network can be used for communications between user computers 340-341. In some embodiments, the same or another internal network can be used for communications between service worker 365, 375 and long-term cache 361, 371, respectively. In some embodiments, the same or another internal network can be used for communications between service worker 365, 375 and short-term cache 362, 372, respectively. In some embodiments, the same or another internal network can be used for communications between service worker 365, 375 and/or content delivery server 320. In some embodiments, the same or another internal network can be used for communications between a service worker 365, 375 and content delivery server 320 where the communications can be exclusively associated with core code JavaScript. In some embodiments, the same or another internal network can be used for communications between a service worker 365, 375 and content delivery server 320 where the communications can be exclusively associated with application code JavaScript. In some embodiments, the same or another internal network can be used for communications between a service worker 365, 375, content delivery server 320, and another computer.

Accordingly, in some embodiments, application system 310 (and/or the software used by such systems), and/or content delivery server 320 (and/or the software used by such systems) can refer to a back end of system 300 operated by an operator and/or administrator of system 300, and application system 310 (and/or the software used by such systems) can refer to a front end of system 300, as it can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

Additional details regarding application server 310, content delivery server 320, and/or service worker 365, 375 are described herein. In these or other embodiments, application server 310, content delivery server 320, and/or service worker 365, 375 can be located spatially apart from each other. Similarly, service worker 365, 375 can communicate with content delivery server 320, and/or application server 310 can communicate with user computer 340-341, and/or vice versa.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, application server 310, content delivery server 320, and/or user computer 340-341, can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to application server 310, content delivery server 320, and/or user computer 340-341, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of application server 310, content delivery server 320, and/or user computer 340-341. In a similar manner, the processors and/or the non-transitory computer-readable media can be local and/or remote to each other.

In certain embodiments, as illustrated in FIG. 3, user computers 340-341 can include service worker 365, 375, and/or cache 360, 370. In some embodiments, cache 360, 370 can include a long-term cache 361, 371, and a short-term cache 362, 372. Long term cache is abbreviated as "LTC" and short-term cache is abbreviated as "STC" in FIG. 3. In some embodiments, service worker 365, 375 is stored within cache 360, 370, respectively, long-term cache 361, 371, respectively, or short-term cache 362, 372, respectively. In several embodiments, service worker 365, 375 can be computer script that a browser (e.g., web browser, user device browser) can run in the background away from a main thread of the computer functions of user computer 340, 341. In many embodiments, service worker 365, 375 can be a web worker and/or a JavaScript file that runs separately from a main browser on user computer 340, 341 that can intercept and/or receive requests (e.g., user, network) to or from user computer 340, 341 and can cache resources (e.g., JavaScript bundles). In some embodiments, service worker 365, 375 can be run separately from downloading a webpage, allowing the service worker to perform computer functions and/or features without a webpage and/or user interaction.

Meanwhile, in many embodiments, application server 310, content delivery server 320, and/or user computer 340-341 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between application server 310, content delivery server 320, and/or user computer 340-341, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, one or more of the webpages displayed by the website hosted by a web server can include one or more JavaScript bundles that can render webpages, and/or content elements of webpages. In some embodiments, these content elements of webpages can include information about one or more items that are available on the website. For example, a webpage can include a content element that includes links to item pages for separate items. In many embodiments, these items can be featured and/or promoted items on the website. Conventionally, these content elements are designed by merchants, and there are many possible content elements from which to select when displaying one or more content elements on a webpage of the website.

Users (e.g., 350-351) can send a request for a webpage (e.g., dynamically-generated webpage) from user computers 340, 341 to application server 310 to receive a visible and/or interactive webpage in return. In some embodiments, users can request webpages in a specific order and/or sequence that can be most commonly visited webpages of a web site, including a homepage of the web site, a search page of the web site, and so on. In several embodiments, after users visit a specific most commonly visited webpage of a website, users can request second and third webpages in a most commonly requested order and/or sequence. This order or sequence can be determined or predicted based on past user activity and/or behavior on the website. Factors influencing this order or sequence can include easy navigation, browsing, shopping, and purchasing of items, among other activities on the webpage. For example, when a user visits a home page of a website, it is highly probable that the user subsequently visits or requests a search page and a checkout page, based on analytics that indicate these pages are the most commonly requested webpages after the homepage is selected. In another example, when a user selects a product page, it is highly probable that the user subsequently visits or requests, a home page, a search page, and a checkout page.

In several embodiments, application server 310 and/or content delivery server 320 can operate various computer processes concurrently by using one or more processes and/or threads (e.g., basic unit based on an operating system that can allocate processor time). In many embodiments, using a main thread, user device 340, 341 can be in data communication with application server 310 that can execute various computer functions. In some embodiments, using a main thread, user device 340, 341 can be in data communication with content delivery sever 320. In several embodiments, using a second thread (e.g., a service worker thread), service worker 365, 375 can be in data communication with long-term cache 361, 371, respectively. In various embodiments, via a second thread, service worker 365, 371 can be in data communication with other portions of user computer 340, 341, respectively. In many embodiments, via a second thread, service worker 365, 375 can be in data communication with content delivery server 320. In several embodiments, using a second thread (e.g., a service worker thread), service worker 365, 375 can be in data communication with short-term cache 362, 372, respectively.

In many embodiments, system 300 can provide an automated approach to displaying a webpage by pre-caching a core bundle of code in long-term cache 361, 371, of user computer 340, 341, where, upon receiving a request to display a webpage on user computer 340, 341, only the custom application code remains to be downloaded onto user computer 340, 341 to render and/or visibly display the webpage on user computer 340, 341. In conventional approaches, each time a user device requests a webpage, a web server and/or an application server, such as application server 310, had to dynamically generate both a core bundle and a custom application code and then download the same to the user device using a main thread in the main process of the user device which leads to sub-optimal processing speed and additional computer resources before the webpage can be visibly displayed on the user device. However, by using two threads instead of only a single thread, the webpage can be rendered using more optimal processing speed and, in some instances, less computer resources before the webpage can be visible and interactive on the user device. Some experimental results have shown that the techniques described herein can save approximately 4.5 seconds downloading a webpage (e.g., home page, check-out page) by pre-loading JavaScript bundles onto the user device from a content delivery server, using two threads to process a request. In several embodiments, experimental results also have shown that the techniques described herein can save 3.5 seconds downloading a webpage (e.g., home page, check-out page) by caching core JavaScript bundles in a user device (e.g., user computer 340-341). In many embodiments, a core code JavaScript bundle can be a type of a universal JavaScript code that can be stored in a user device cache from a content delivery computer cache where each webpage of a website uses the core code JavaScript code, along with a custom application code for each webpage, to render a webpage, such as a home page, a search page, a content page, a product page, and other such webpages. In some embodiments, the core code JavaScript can make up more than half of the application code for a webpage, leaving less than half of the application code remaining to be downloaded upon request from the user device.

In many embodiments, system 300 can provide an automated approach to displaying a webpage by pre-loading (e.g., pre-fetching) webpages from content delivery server 320 onto user computer 340, 341, where a service worker pre-loads the JavaScript bundle into the user computer using a second thread that does not interfere with the main thread to render subsequent webpages most commonly visited after a selection of a first webpage. From time-to-time, tracked data for application code including a core bundle of code and a custom application code can be updated in content delivery server 320 and long-term cache memory in user computer 340, 341.

Figure 4:
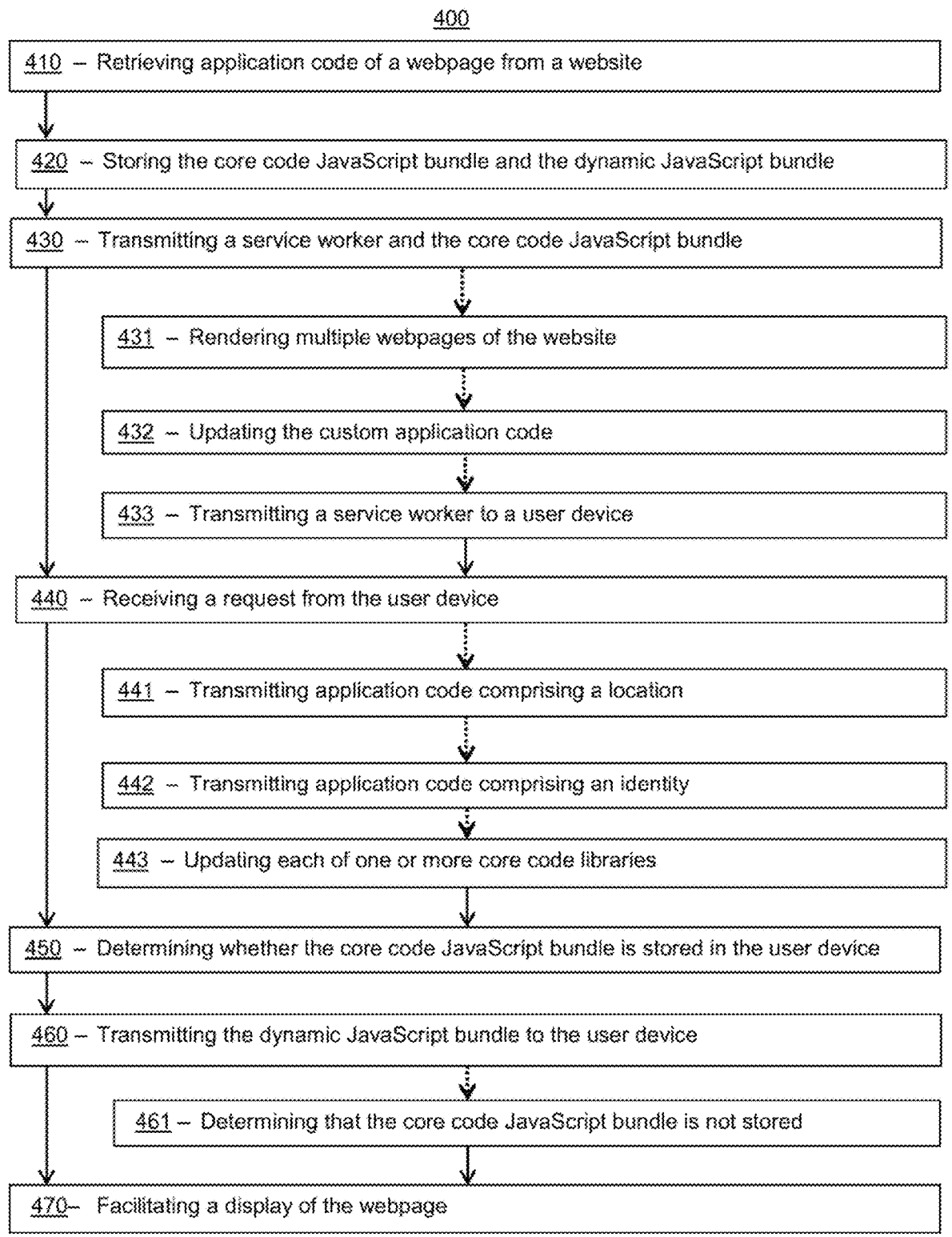
FIG. 4 illustrates a flow chart for a method, according to another embodiment.

Turning ahead in the drawings, FIG. 4 illustrates a flow chart for a method 400. In some embodiments, method 400 can be a method of automatically rendering of a webpage on a user device displaying a visible and/or interactive webpage by caching or pre-caching a core JavaScript bundle in a user device. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), application server 310 (FIG. 3) and/or content delivery server (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as application server 310 (FIG. 3) and/or content delivery server (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks by using one or more threads concurrently and while still allowing data to be accessible from a central location.

Referring to FIG. 4, method 400 can comprise an activity 410 of retrieving application code of a webpage from a website. In some embodiments of activity 410, the application code can include a core code JavaScript bundle and a dynamic JavaScript bundle. The user device can be similar or identical to user computer 340-341 (FIG. 3).

Next, in several embodiments, method 400 also can comprise activity 420 of storing the core code JavaScript bundle and the dynamic JavaScript bundle in a cache of a content delivery computer. In many embodiments, activity 420 can include storing the dynamic JavaScript bundle that also includes custom application code that, together with the core code JavaScript bundle, can render the webpage using at least a client-side rendering process.

In a number of embodiments, after activity 430, method 400 can comprise activity 430 of, transmitting to a user device of a user (i) a service worker and (ii) the core code JavaScript bundle. The core code JavaScript bundle can be transmitted from the cache of the content delivery computer and can be stored in a long-term cache memory of the user device.

In several embodiments, activity 430 can comprise activity 431 of rendering multiple webpages of the website based on using the core code JavaScript bundle stored in the long-term cache memory of the user device. In the same or different embodiments, the multiple webpages of the website can be rendered based on using the core code JavaScript bundle stored in the cache of the content delivery computer.

In several embodiments, activity 430 also can comprise activity 432 of periodically updating the custom application code JavaScript bundle stored in the cache of the content delivery computer. In many embodiments, the content delivery computer or another computer can be programmed to conduct the periodic update within the content delivery computer an "N" number of times within any period of time and/or time interval. In the same or different embodiments, activity 442 is performed periodically after one or more of activities 440, 450, or 460.

In several embodiments, activity 430 additionally can comprise activity 433 of transmitting, via the main thread, a service worker to a user device of a user. In some embodiments, a web server and/or an application server can initialize a service worker to a user device where the service worker remains to perform specific functions on a second thread, such as checking the long-term cache on the user device for core code JavaScript bundle. In several embodiments, the service worker can be programmed to perform additional specific functions and/or features such as checking the content delivery server for a core code JavaScript bundle when the same has been stored in the long-term cache of the user device. In many embodiments, a service worker can retrieve application code JavaScript bundles from the content delivery computer to download to a user device. In some embodiments, a service worker can retrieve application code JavaScript bundles from the content delivery computer to download to short-term cache 362, 372 (FIG. 3) on user computer 340-341 (FIG. 3).

In several embodiments, after activity 430, method 400 further can comprise activity 440 of receiving, via a main thread of the user device to an application server, a request from the user device to view the webpage on the user device. In many embodiments, the webpage can be one of the webpages on the website that includes one or more different webpages. For example, the webpage can be a homepage, a search page, a check-out page, or another webpage of the web site.

In some embodiments, activity 440 can comprise activity 441 of, in response to receiving the request from the user device, application server 310 (FIG. 3) can transmit application code to the user device if the same is not already stored on the user device. In some embodiments, application server can relay application code information comprising a location of core code Java Script and/or custom application code JavaScript stored in the content delivery computer. In several embodiments, the core code JavaScript bundle and the dynamic JavaScript bundle can be associated with rendering the webpage, as requested.

In several embodiments, activity 440 also can comprise activity 442 of, in response to receiving the request from the user device, application server 310 (FIG. 3) can transmit application code to the user device if the same is not already stored on the user device, where the application server can relay information that can comprise information comprising an identity of the core code JavaScript bundle and/or the dynamic JavaScript bundle stored in the content delivery computer. In some embodiments, the core code JavaScript bundle and the dynamic JavaScript bundle can be associated with rendering the webpage, as requested. In many embodiments, the application server can receive requests and relay information related to the application code for the requested webpage. In some embodiments, the application server does not store and/or download any JavaScript code to content delivery server 320 and/or user computer 340-341.

In some embodiments, activity 440 also can comprise activity 443 of periodically updating, using the service worker via a second thread of the user device to the content delivery computer, each of one or more core code libraries in the core code JavaScript bundle stored in the long-term cache memory of the user device. In the same or different embodiments, activity 443 is performed periodically after one or more of activities 450 or 460. The service worker can be similar or identical to service worker "SW" 365, 375 (FIG. 3). In various embodiments, the application code can be divided into a core code JavaScript bundle and a customer application code bundle, which can be performed in some embodiments by using another computer. In many embodiments, the application code, as divided into a core code JavaScript bundle and a customer application code bundle, can be temporarily cached by another computer prior to caching the separated JavaScript code bundles into the content delivery server, such as content delivery server 320 (FIG. 3). In some embodiments, application code for each webpage of a web site resides in the content delivery server, such as content delivery server 320, either in as separated JavaScript code or as a complete JavaScript code for the entire webpage. In several embodiments, core code JavaScript can include core libraries of code used by all other webpages on the website to be rendered into a visible and/or interactive webpage. In many embodiments, custom application code can include code that is customized for or used for only one of a homepage, a search page, a content page, a product page, or other webpages of a website.

Figure 6:
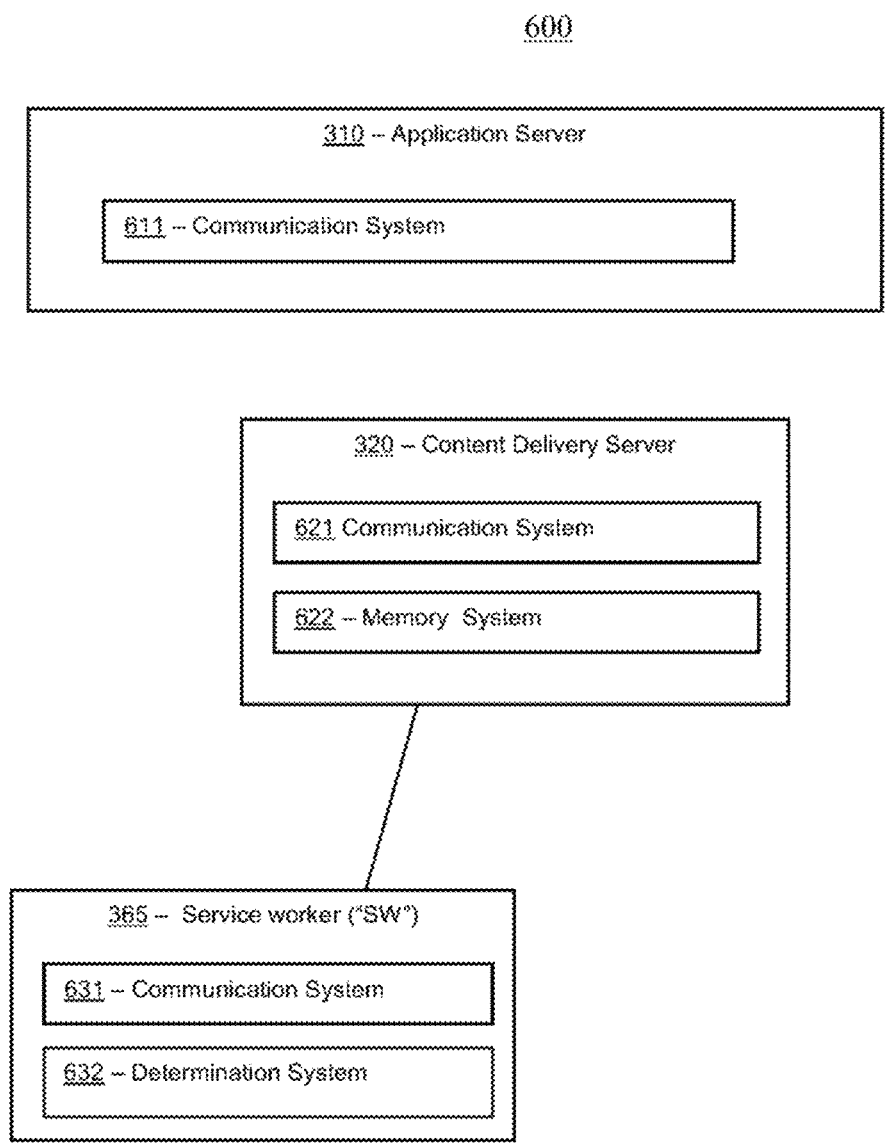
FIG. 6 illustrates a representative block diagram for automatically rendering of a webpage on a user device, according to the embodiment of FIG. 3.

In a number of embodiments, after activity 440, method 400 additionally can comprise activity 450 of, in response to receiving the request, concurrently with the main thread from the user device to the application server, determining, using the service worker via the second thread from the service worker to the long-term cache memory of the user device, whether the core code JavaScript bundle for the webpage is stored in the long-term cache memory of the user device. In many embodiments, activity 450 can be implemented as shown in FIG. 6 and described below.

Next, in a number of embodiments, after activity 450, method 400 additionally can comprise activity 460 of, in response to receiving the request and when the service worker determines that the core code JavaScript bundle for the webpage is stored in the long-term cache memory of the user device, transmitting, via the main thread from the user device to the content delivery computer, the custom application code JavaScript bundle directly from the content delivery computer to the user device. This custom application code JavaScript bundle can be uniquely for the webpage that is requested to be displayed on the user device.

In several embodiments, activity 460 can comprise activity 461, of when the service worker determines that the core code JavaScript bundle for the webpage is not stored in the long-term cache memory of the user device or elsewhere in the user device, the activity can include requesting from the content delivery computer, using the service worker via the second thread of the user device to the content delivery computer, a core code JavaScript bundle to be used in client-side rendering of the webpage. In many embodiments, activity 461 will not be performed when activity 460 is performed, and vice versa.

In a number of embodiments, method 400 additionally can comprise activity 470 of, in response to receiving the request and when the service worker determines that the core code JavaScript bundle for the webpage is stored in the long-term cache memory of the user device, facilitating a display of the webpage in a browser of the user device using (i) the dynamic JavaScript bundle, as transmitted from the content delivery computer to the user device, and (ii) the core code JavaScript bundle, as stored in the long-term cache memory of the user device.

Figure 5:
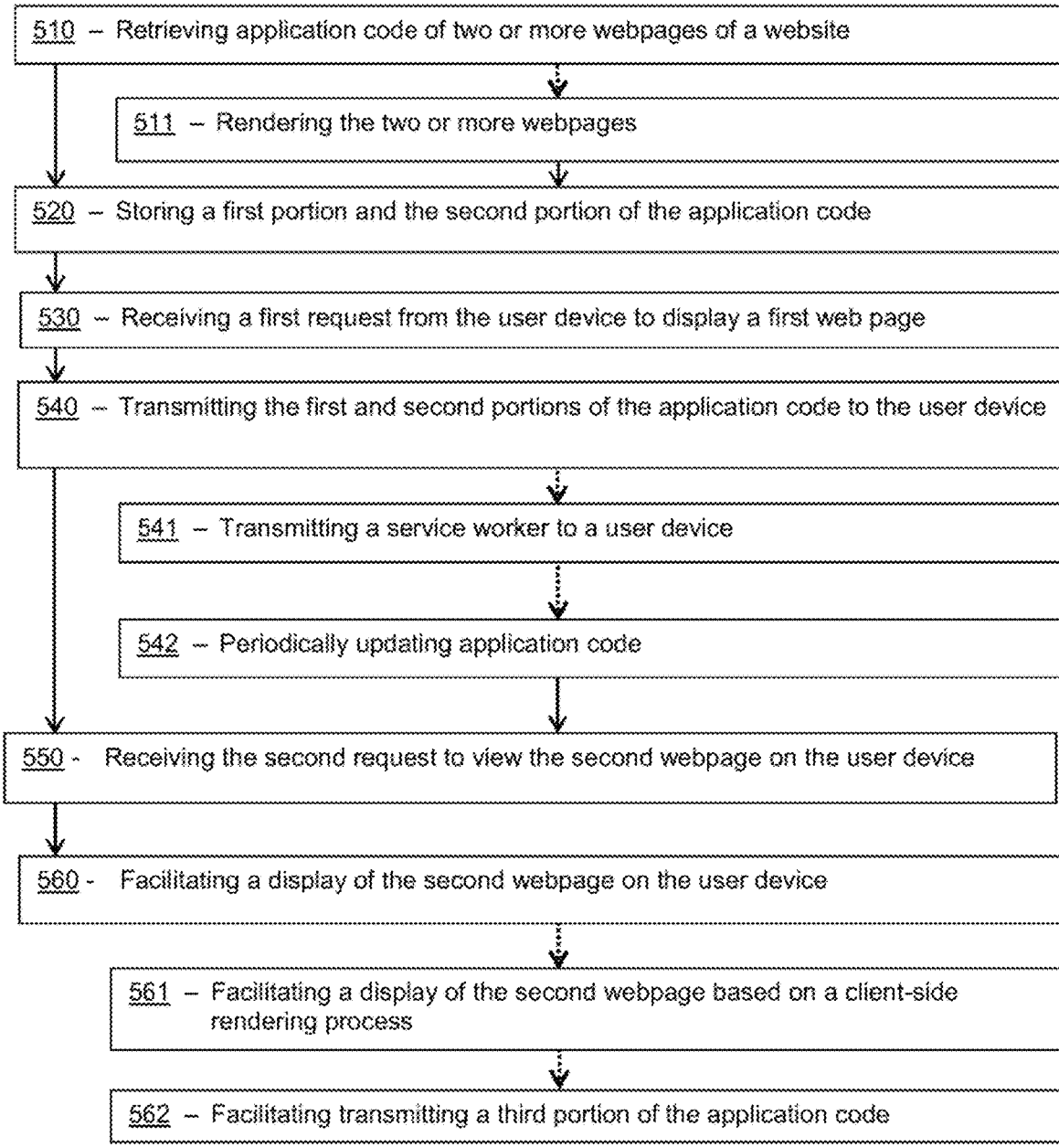
FIG. 5 illustrates a flow chart for a method, according to another embodiment.

Turning ahead in the drawings, FIG. 5 illustrates a flow chart for a method 500. In some embodiments, method 500 can be a method of automatically rendering of a webpage on a user device displaying a visible and/or interactive webpage by pre-loading one or more JavaScript bundles onto a user device. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), application server 310 (FIG. 3) and/or content delivery serve 320 (FIG. 3) can be suitable to perform method 400 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as application server 310 and/or content delivery server 320. The processor(s) can be similar or identical to the processor(s) described above with respect to computer system 100 (FIG. 1).

In some embodiments, method 500 and other activities in method 500 can include using a distributed network including distributed memory architecture to perform the associated activity. This distributed architecture can reduce the impact on the network and system resources to reduce congestion in bottlenecks by using one or more threads concurrently and while still allowing data to be accessible from a central location.

Referring to FIG. 5, method 500 can include an activity 510 of retrieving application code of two or more webpages of a web site to render the two or more webpages on a user device. In many embodiments, a first portion of the application code can be for rendering a first webpage of the two or more webpages of the website and comprises a first JavaScript bundle, and a second portion of the application code can be for rendering a second webpage of the two or more webpages of the website and can include a second JavaScript bundle. In these embodiments, the first and second webpages can be different from each other; the first and second portions of the application code can be different from each other; and the first and second JavaScript bundles can be different from each other. The user device can be similar or identical to user computer 340, 341 (FIG. 3). The one or more websites can be similar or identical to the website hosted by web server and/or application server 310 (FIG. 3), as described above.

In several embodiments, activity 510 can include an activity 511 of rendering the two or more webpages of the website stored in the cache memory of the content delivery server.

In a number of embodiments, after activity 520, method 500 can include an activity 520 of storing the first portion and the second portion of the application code of the two or more webpages of the web site in a cache memory of a content delivery server.

Next, in several embodiments, method 500 can continue with an activity 530 of receiving a request from a user device of a user to display a webpage of the one or more websites on the user device. In many embodiments, the webpage can be one of the webpages on the web site that includes one or more content elements and/or interactive elements. For example, the webpage can be a homepage of the website, or another webpage of the website that includes one or more content elements.

In several embodiments, after activity 530, method 500 further can include an activity 540 of, in response to receiving the first request and prior to receiving, from the user device of the user, a second request to view the second webpage on the user device, transmitting the first and second portions of the application code to the user device. In some embodiments, activity 540 can include transmitting, via the main thread from the user device to the content delivery server, the first portion of the application code to the user device to render the first webpage on the user device. In several embodiments, the first portion of the application code can be sent from the cache memory of the content delivery server to the user device. In the same or different embodiments, activity 540 also can include transmitting, using the service worker via a second thread from the user device to the content delivery server, the second portion of the application code to the user device for storage on the user device. In many embodiments, the second portion of the application code can be sent from the cache memory of the content delivery server to the user device. In many embodiments, transmitting the first and second portions of the application code to the user device can occur concurrently with each other via the main and second threads from the user device to the content delivery server.

As explained above, the simultaneous transmission of the first and second portion of the application code (or at least the transmission of the second portion of the application code) before receiving a request to display the second webpage that requires the use of the second portion of the application code, can provide the advantages described above of reducing, minimizing, or eliminating a delay between the user requesting the webpage and the user viewing the webpage. As also explained above, the particular application code to be downloaded as the second portion of the application code can be determined based on past user activity as to which webpage(s) are most likely to be requested next by the user after viewing the first webpage.

Activity 540 also can include facilitating a display of the first webpage on the user device using the first portion of the application code stored on the user device. In some embodiments, this additional action within activity 540 can occur via the main thread from the user device to the content delivery server, and in other embodiments, this additional action within activity 540 can occur via the second thread from the user device to the content delivery server.

As shown in FIG. 5, in a number of embodiments, activity 540 also can include an activity 541, of transmitting the service worker to the user device of the user. Activity 541 can occur via the main thread from the user device to the application server, or via the main thread from the user device to the content delivery server. Also, activity 541 is optional and can be skipped if the service worker was previously transmitted to the user device and stored on the user device. Accordingly, activity 541 can include an activity of determining whether the service worker is already stored on the user device.

In various embodiments, activity 540 can include an activity 542 of periodically updating, using the service worker via the second thread from the user device to the content delivery server, each of the first and second portions of the application code for the first and second webpages of the two or more webpages on the user device. In some of these embodiments, activity 542 periodically updates, using the service worker via the second thread from the user device to the content delivery server, the second portion of the application code for the second webpage of the two or more webpages on the user device before the system receives a request to display the second webpage that requires the use of the second portion of the application code.

In several embodiments, after activity 540, method 500 further can include an activity 550 of, after transmitting the first and second portions of the application code to the user device, receiving, via the main thread from the user device to the application server, the second request to view the second webpage on the user device.

Next, in some embodiments, method 500 further can include an activity 560 of, in response to receiving the second request, facilitating, using the service worker and via the second thread from the user device to the content delivery server, a display of the second webpage on the user device using the second portion of the application code stored on the user device. In other embodiments, activity 560 can occur via the main thread from the user device to the content delivery server.

In many embodiments, activity 560 also can include activity 561 of facilitating a display of the second webpage on the user device based on a client-side rendering process. In many embodiments, activity 561 is part of or replaces activity 560, and is not a separate or additional process from activity 560.

In various embodiments, activity 560 also can include an activity 562 can transmitting a third portion of the application code to the user device for storage on the user device. The third portion of the application code can be for rendering a third webpage of the two or more webpages of the web site and can comprise a third JavaScript bundle. The first, second, and third webpages can different from each other; the first, second, and third portions of the application code are different from each other; and the first, second, and third JavaScript bundles are different from each other. Activity 562 can occur in response to receiving the second request and prior to receiving, from the user device of the user, the third request to view the third webpage of the two or more webpages of the web site on the user device. As explained above, the particular application code to be downloaded as the third portion of the application code can be determined based on past user activity as to which webpage(s) are most likely to be requested next by the user after viewing the second webpage.

In some embodiments, the transmission of the third portion of the application code to the user device in activity 562 can occur using the service worker via the second thread from the user device to the content delivery server. In other embodiments, the transmission of the third portion of the application code to the user device in activity 562 can occur via the main thread from the user device to the content delivery server. In either of these embodiments, transmitting the third portion of the application to the user device can occur concurrently with activity 560 of facilitating the display of the second webpage on the user device. In one example, activities 560 and 562 can occur concurrently with each other via the main thread from the user device to the content delivery server for activity 560 and via the second thread from the user device to the content delivery server for activity 562.

Also, in these embodiments, after transmitting the third portion of the application code to the user device in activity 562, method 500 can include receiving, via the main thread from the user device to the application server, the third request to view the third webpage on the user device. Then, in response to receiving the third request, method 500 can include facilitating, using the service worker and via the second thread from the user device to the content delivery server, a display of the third webpage on the user device using the third portion of the application code stored on the user device. In other embodiments, facilitating the display of the third webpage on the user device using the third portion of the application code stored on the user device can occur via the main thread from the user device to the content delivery server.

Turning back in the drawings, FIG. 6 illustrates a block diagram of system 300, according to the embodiment shown in FIG. 3. Application server 310, content delivery server 320, and/or service worker 365 are merely exemplary and are not limited to the embodiments presented herein. Application server 310, content delivery server 320, and/or service worker 365 can be employed in many different embodiments or examples not specifically depicted or described herein. In some embodiments, certain elements or systems of Application server 310, content delivery server 320, and/or service worker 365 can perform various procedures, processes, and/or acts. In other embodiments, the procedures, processes, and/or acts can be performed by other suitable elements or systems. In many embodiments, the systems of application server 310, content delivery server 320, and/or service worker 365 can be modules of computing instructions (e.g., software modules) stored at non-transitory computer readable media. In other embodiments, the systems of application server 310, content delivery server 320, and/or service worker 365 can be implemented in hardware.

In many embodiments, application server 310 can include a communication system 611. In certain embodiments, communication system 611 can at least partially perform activity 430 (FIG. 4) of transmitting to a user device of a user (i) a service worker and (ii) the core code JavaScript bundle, wherein the core code JavaScript bundle can be transmitted from the cache of the content delivery computer and can be stored in a long-term cache memory of the user device, activity 431 of rendering multiple webpages of the website based on using the core code JavaScript bundle that can be stored in the long-term cache memory of the user device, activity 432 (FIG. 4) of periodically updating the custom application code in the dynamic JavaScript bundle stored in the cache of the content delivery computer, activity 433 (FIG. 4) of transmitting, via the main thread, a service worker to a user device of a user, activity 440 (FIG. 4) of receiving, via a main thread of the user device to an application server, a request from the user device to view the webpage on the user device, activity 441 (FIG. 4) of in response to receiving the request from the user device, transmitting application code to the user device, wherein the application code comprises information comprising a location, activity 442 (FIG. 4) of, in response to receiving the request from the user device, transmitting application code to the user device, wherein the application code comprises information comprising an identity, activity 530 (FIG. 5) of receiving, via a main thread from a user device to an application server, a first request from the user device to view the first webpage on the user device, activity 540 (FIG. 5) of prior to receiving, from the user device of the user, a second request to view the second webpage on the user device, transmitting the first portion of the application code to the user device and transmitting the second portion of the application code to the user device and/or activity 550 (FIG. 5) of receiving, via the main thread from the user device to the application server, the second request to view the second webpage on the user device. In some embodiments, transmitting the first and second portions of the application code can result in the first and second portions of the application code being stored in the short-term cache memory of the user device. In other embodiments, transmitting the first and second portions of the application code can result in the first and second portions of the application code being stored in the long-term cache memory of the user device.

In a number of embodiments, content delivery server 320 can include a communication system 621. In certain embodiments, user classification system 612 can at least partially perform activity 410 (FIG. 4) of retrieving application code of a webpage from a website where the application code comprises a core code JavaScript bundle and a dynamic JavaScript bundle, activity 411 (FIG. 4) of periodically updating, using the service worker via the second thread of the user device to the content delivery computer, each of one or more core code libraries in the core code JavaScript bundle stored in the long-term cache memory of the user device, activity 470 (FIG. 4) of facilitating a display of the webpage in a browser of the user device using (i) the dynamic JavaScript bundle, as transmitted from the content delivery computer to the user device, and (ii) the core code JavaScript bundle, as stored in the long-term cache memory of the user device, activity 510 (FIG. 5) of retrieving application code of two or more webpages of a web site to render the two or more webpages on a user device, and/or activity 511 (FIG. 5) of rendering the two or more webpages of the web site stored in the cache memory of the content delivery server.

In many of embodiments, content delivery server 320 can include a memory system 632. In certain embodiments, memory system 632 can at least partially perform activity 420 (FIG. 4) determining, using the service worker via a second thread of the service worker to the long-term cache memory of the user device, whether the core code JavaScript bundle for the webpage is stored in the long-term cache memory of the user device and/or activity 520 (FIG. 5) of storing the first portion and the second portion of the application code of the two or more webpages of the website in a cache memory of a content delivery server.

In a number of embodiments, service worker system 365 can include a communication system 631. In certain embodiments, communication system 631 can at least partially perform activity 460 (FIG. 4) of transmitting, via the main thread from the user device to the content delivery computer, the dynamic JavaScript bundle for the webpage from the content delivery computer to the user device, activity 542 (FIG. 5) of transmitting, via the main thread, a service worker to a user device of a user, activity 560 (FIG. 5) of facilitating, using the service worker and via the second thread from the user device to the content delivery server, a display of the second webpage on the user device using the second portion of the application code stored on the user device, activity 561 (FIG. 5) of facilitating a display of the first webpage on the user device based on a client-side rendering process, and/or activity 562 (FIG. 5) of facilitating the display of the first webpage further comprises the transmitting the first portion of the application code to the user device.

In many embodiments, service worker system 365 can include a determination system 632. In certain embodiments, determination system 632 can at least partially perform activity 450 (FIG. 4) transmitting, via the main thread from the user device to the content delivery computer, the dynamic JavaScript bundle for the webpage from the content delivery computer to the user device, activity 461 (FIG. 4)

of when the service worker determines that the core code JavaScript bundle for the webpage is not stored in the long-term cache memory of the user device, requesting from the content delivery computer, using the service worker via the second thread of the user device to the content delivery computer, the core code JavaScript bundle to be used in client-side rendering of the webpage, and/or activity 541 (FIG. 5) of periodically updating, using the service worker via the second thread from the user device to the content delivery server, each of the first and second portions of the application code for the first and second webpages of the two or more webpages.

Various embodiments can include a system including one or more processors and one or more non-transitory computer-readable media storing computing instructions configured to run on the one more processors and perform certain acts. The acts can include retrieving application code of a webpage from a website. The acts also can include the application code comprising a core code JavaScript bundle and a dynamic JavaScript bundle. The acts can include storing the core code JavaScript bundle and the dynamic JavaScript bundle in a cache of a content delivery computer. The cache of a content delivery computer can include the dynamic JavaScript bundle that can include custom application code to render the webpage. The acts further can include transmitting to a user device of a user a service worker and the core code JavaScript bundle. The core code JavaScript bundle can be transmitted from the cache of the content delivery computer and can be stored in a long-term cache memory of the user device. The acts can include receiving, via a main thread from the user device to an application server, a request from the user device to view the webpage on the user device. In response to receiving the request, the acts can concurrently with the main thread from the user device to the application server, can be determining, using the service worker via a second thread from the service worker to the long-term cache memory of the user device, whether the core code JavaScript bundle for the webpage is stored in the long-term cache memory of the user device. When the service worker determines that the core code JavaScript bundle for the webpage is stored in the long-term cache memory of the user device, the acts can include transmitting, via the main thread from the user device to the content delivery computer, the dynamic JavaScript bundle for the webpage from the content delivery computer to the user device. The acts can include facilitating a display of the webpage in a browser of the user device using the dynamic JavaScript bundle, as transmitted from the content delivery computer to the user device. The acts further include facilitating a display of the webpage in a browser of the user device using the core code JavaScript bundle, as stored.

A number of embodiments can include a method being implemented via execution of computing instructions configured to run at one or more processors and stored at one or more non-transitory computer-readable media. The method can include retrieving application code of a webpage from a website. The method also can include retrieving the application code including a core code JavaScript bundle and a dynamic JavaScript bundle. The method can include storing the core code JavaScript bundle and the dynamic JavaScript bundle in a cache of a content delivery computer. The method additionally can include storing the dynamic JavaScript bundle that can include custom application code to render the webpage. The method can include transmitting to a user device of a user (i) a service worker and (ii) the core code JavaScript bundle. The method can include the core code JavaScript bundle that can be transmitted from the cache of the content delivery computer and can be stored in a long-term cache memory of the user device. The method also can include receiving, via a main thread from the user device to an application server, a request from the user device to view the webpage on the user device. In response to receiving the request, concurrently with the main thread from the user device to the application server, the method can include determining, using the service worker via a second thread from the service worker to the long-term cache memory of the user device, whether the core code JavaScript bundle for the webpage is stored in the long-term cache memory of the user device. When the service worker determines that the core code JavaScript bundle for the webpage is stored in the long-term cache memory of the user device, the method also can include transmitting, via the main thread from the user device to the content delivery computer, the dynamic JavaScript bundle for the webpage from the content delivery computer to the user device. The method can include facilitating a display of the webpage in a browser of the user device using the dynamic JavaScript bundle, as transmitted from the content delivery computer to the user device. The method can include facilitating a display of the webpage in a browser of the user device using the core code JavaScript bundle, as stored in the long-term cache memory of the user device.

Various embodiments can include a system including one or more processors and one or more non-transitory computer-readable media storing computing instructions configured to run on the one more processors and perform certain acts. The acts can include retrieving application code of two or more webpages of a website to render the two or more webpages on a user device. A first portion of the application code is for rendering a first webpage of the two or more webpages of the website can include a first JavaScript bundle. A second portion of the application code can be used for rendering a second webpage of the two or more webpages of the website and can include a second JavaScript bundle. The first and second webpages can be different from each other. The first and second portions of the application code also can be different from each other, and the first and second JavaScript bundles can be different from each other. The acts can include storing the first portion and the second portion of the application code of the two or more webpages of the website in a cache memory of a content delivery server. The acts can include receiving, via a main thread from a user device to an application server, a first request from the user device to view the first webpage on the user device. In response to receiving the first request and prior to receiving, from the user device of the user, a second request to view the second webpage on the user device the acts can include transmitting, via the main thread from the user device to the content delivery server, the first portion of the application code to the user device to render the first webpage on the user device. The first portion of the application code can be sent from the cache memory of the content delivery server to the user device. In response to receiving the first request and prior to receiving, from the user device of the user, a second request to view the second webpage on the user device the acts also can include transmitting, using a service worker via a second thread from the user device to the content delivery server, the second portion of the application code to the user device for storage on the user device. The second portion of the application code can be sent from the cache memory of the content delivery server to the user device. Transmitting the first and second portions of the application code to the user device can occur concurrently with each other via the main and second threads from the user device to the content delivery server. After transmitting the first and second portions of the application code to the user device, the acts can be receiving, via the main thread from the user device to the application server, the second request to view the second webpage on the user device. The acts can also include, in response to receiving the second request, facilitating, using the service worker and via the second thread from the user device to the content delivery server, a display of the second webpage on the user device using the second portion of the application code stored on the user device.

Many embodiments can include a method being implemented via execution of computing instructions configured to run at one or more processors and stored at one or more non-transitory computer-readable media. The method can include retrieving application code of two or more webpages of a website to render the two or more webpages on a user device. A first portion of the application code can be for rendering a first webpage of the two or more webpages of the website and can include a first JavaScript bundle. A second portion of the application code can be for rendering a second webpage of the two or more webpages of the website and can include a second JavaScript bundle. The first and second webpages can be different from each other. The first and second portions of the application code can be different from each other. The first and second JavaScript bundles also can be different from each other. The method can include storing the first portion and the second portion of the application code of the two or more webpages of the web site in a cache memory of a content delivery server. The method can also include receiving, via a main thread from a user device to an application server, a first request from the user device to view the first webpage on the user device. In response to receiving the first request and prior to receiving, from the user device of the user, a second request to view the second webpage on the user device, the method can be transmitting, via the main thread from the user device to the content delivery server, the first portion of the application code to the user device to render the first webpage on the user device. The first portion of the application code can be sent from the cache memory of the content delivery server to the user device. Prior to receiving, from the user device of the user, a second request to view the second webpage on the user device, the method also can be transmitting, using a service worker via a second thread from the user device to the content delivery server, the second portion of the application code to the user device for storage on the user device. The second portion of the application code can be sent from the cache memory of the content delivery server to the user device. Transmitting the first and second portions of the application code to the user device can be occurring concurrently with each other via the main and second threads from the user device to the content delivery server. After transmitting the first and second portions of the application code to the user, the method can be receiving, via the main thread from the user device to the application server, the second request to view the second webpage on the user device. The method can include, in response to receiving the second request, facilitating, using the service worker and via the second thread from the user device to the content delivery server, a display of the second webpage on the user device using the second portion of the application code stored on the user device.

Although automatically rendering of a webpage on a user device displaying a visible and/or interactive webpage by caching a core JavaScript bundle in a user device has been described with reference to specific embodiments, it will be understood by those skilled in the art that various changes may be made without departing from the spirit or scope of the disclosure. Additionally, although automatically rendering of a webpage on a user device displaying a visible and/or interactive webpage by pre-loading one or more JavaScript bundles in a user device has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders, and/or one or more of the procedures, processes, or activities of FIGS. 4-6 may include one or more of the procedures, processes, or activities of another different one of FIGS. 4-6. As another example, the systems within application system 310, content delivery system 320 and/or service worker 365 in FIG. 6 can be interchanged or otherwise modified. Furthermore, code described to be stored in cache can be stored in long-term cache or short-term cache. For example, code described to be stored in long-term cache can be stored in short-term cache, and vice versa.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured, when executed by the one or more processors, to perform:
retrieving application code of a webpage from a website, the application code comprising a core code JavaScript bundle and a dynamic JavaScript bundle;
storing the core code JavaScript bundle and the dynamic JavaScript bundle in a cache of a content delivery computer, wherein the dynamic JavaScript bundle comprises custom application code to render the webpage;
transmitting to a user device of a user (i) a service worker and (ii) the core code JavaScript bundle, wherein the core code JavaScript bundle is transmitted from the cache of the content delivery computer and is stored in a long-term cache memory of the user device;

receiving, via a main thread from the user device to an application server, a request from the user device to view the webpage on the user device; and in response to receiving the request:
concurrently with the main thread from the user device to the application server, determining, using the service worker via a second thread from the service worker to the long-term cache memory of the user device, whether the core code JavaScript bundle for the webpage is stored in the long-term cache memory of the user device;

when the service worker determines that the core code JavaScript bundle for the webpage is stored in the long-term cache memory of the user device, transmitting, via the main thread from the user device to the content delivery computer, the dynamic JavaScript bundle for the webpage from the content delivery computer to the user device; and facilitating a display of the webpage in a browser of the user device using (i) the dynamic JavaScript bundle, as transmitted from the content delivery computer to the user device, and (ii) the core code JavaScript bundle, as stored in the long-term cache memory of the user device, wherein the core code JavaScript bundle and the dynamic JavaScript bundle are combined to be used for client-side rendering of the webpage.

2. The system of claim 1, wherein the computing instructions are further configured, when executed by the one or more processors, to perform:
facilitating client-side rendering of multiple webpages of the website based on using the core code JavaScript bundle stored in the long-term cache memory of the user device.

3. The system of claim 1, wherein the computing instructions are further configured, when executed by the one or more processors, to perform:
periodically updating, using the service worker via the second thread from the user device to the content delivery computer, each of one or more core code libraries in the core code JavaScript bundle stored in the long-term cache memory of the user device.

4. The system of claim 1, wherein the computing instructions are further configured, when executed by the one or more processors, to perform:
periodically updating the custom application code in the dynamic JavaScript bundle stored in the cache of the content delivery computer.

5. The system of claim 1, wherein the computing instructions are further configured, when executed by the one or more processors, to perform:
when the service worker determines that the core code JavaScript bundle for the webpage is not stored in the long-term cache memory of the user device:
requesting from the content delivery computer, using the service worker via the second thread from the user device to the content delivery computer, the core code JavaScript bundle to be used in the client-side rendering of the webpage.

6. The system of claim 5, wherein:
requesting from the content delivery computer, using the service worker via the second thread from the user device to the content delivery computer, the core code JavaScript bundle further comprises:
retrieving a first core code JavaScript bundle.

7. The system of claim 1, wherein the computing instructions, when executed by the one or more processors, are further configured to perform:
in response to receiving the request from the user device, transmitting application code to the user device, wherein the application code comprises information comprising a location in the content delivery computer of the core code JavaScript bundle and the dynamic JavaScript bundle associated with rendering the webpage, as requested.

8. The system of claim 1, the computing instructions, when executed by the one or more processors, are further configured to perform:
in response to receiving the request from the user device, transmitting application code to the user device, wherein the application code comprises information comprising an identity of the core code JavaScript bundle and the dynamic JavaScript bundle in the content delivery computer, wherein the core code JavaScript bundle and the dynamic JavaScript bundle are associated with rendering the webpage, as requested.

9. The system of claim 1, wherein transmitting to the user device of the user (i) the service worker and (ii) the core code JavaScript bundle comprises:
transmitting, via the main thread from the user device, the service worker to the user device of the user.

10. A method being implemented via execution of computing instructions configured to run at one or more processors and stored at one or more non-transitory computer-readable media, the method comprising:
retrieving application code of a webpage from a website, the application code comprising a core code JavaScript bundle and a dynamic JavaScript bundle;

storing the core code JavaScript bundle and the dynamic JavaScript bundle in a cache of a content delivery computer, wherein the dynamic JavaScript bundle comprises custom application code to render the webpage;

transmitting to a user device of a user (i) a service worker and (ii) the core code JavaScript bundle, wherein the core code JavaScript bundle is transmitted from the cache of the content delivery computer and is stored in a long-term cache memory of the user device;

receiving, via a main thread from the user device to an application server, a request from the user device to view the webpage on the user device; and in response to receiving the request:
concurrently with the main thread from the user device to the application server, determining, using the service worker via a second thread from the service worker to the long-term cache memory of the user device, whether the core code JavaScript bundle for the webpage is stored in the long-term cache memory of the user device;

when the service worker determines that the core code JavaScript bundle for the webpage is stored in the long-term cache memory of the user device, transmitting, via the main thread from the user device to the content delivery computer, the dynamic JavaScript bundle for the webpage from the content delivery computer to the user device; and facilitating a display of the webpage in a browser of the user device using (i) the dynamic JavaScript bundle, as transmitted from the content delivery computer to the user device, and (ii) the core code JavaScript bundle, as stored in the long-term cache memory of the user device, wherein the core code JavaScript bundle and the dynamic JavaScript bundle are combined to be used for client-side rendering of the webpage.

11. The method of claim 10, further comprising:
facilitating client-side rendering of multiple webpages of the website based on using the core code JavaScript bundle stored in the long-term cache memory of the user device.

12. The method of claim 10, further comprising:
periodically updating, using the service worker via the second thread from the user device to the content delivery computer, each of one or more core code libraries in the core code JavaScript bundle stored in the long-term cache memory of the user device.

13. The method of claim 10, further comprising:
periodically updating the custom application code in the dynamic JavaScript bundle stored in the cache of the content delivery computer.

14. The method of claim 10, further comprising:
when the service worker determines that the core code JavaScript bundle for the webpage is not stored in the long-term cache memory of the user device:
requesting from the content delivery computer, using the service worker via the second thread from the user device to the content delivery computer, the core code JavaScript bundle to be used in the client-side rendering of the webpage.

15. The method of claim 14, wherein requesting from the content delivery computer, using the service worker via the second thread from the user device to the content delivery computer, the core code JavaScript bundle further comprises:
retrieving a first core code JavaScript bundle.

16. The method of claim 10, further comprising:
in response to receiving the request from the user device, transmitting application code to the user device, wherein the application code comprises information comprising a location in the content delivery computer of the core code JavaScript bundle and the dynamic JavaScript bundle associated with rendering the webpage, as requested.

17. The method of claim 10, further comprising:
in response to receiving the request from the user device, transmitting application code to the user device, wherein the application code comprises information comprising an identity of the core code JavaScript bundle and the dynamic JavaScript bundle in the content delivery computer, wherein the core code JavaScript bundle and the dynamic JavaScript bundle are associated with rendering the webpage, as requested.

18. The method of claim 10, wherein transmitting to the user device of the user (i) the service worker and (ii) the core code JavaScript bundle comprises:
transmitting, via the main thread of the user device, the service worker to the user device of the user.

19. The system of claim 6, wherein the first core code JavaScript bundle is cached in the long-term cache memory of the user device.

20. The method of claim 15, wherein the first core code JavaScript bundle is cached in the long-term cache memory of the user device.

* * * * *